UNITED STATES PATENT OFFICE.

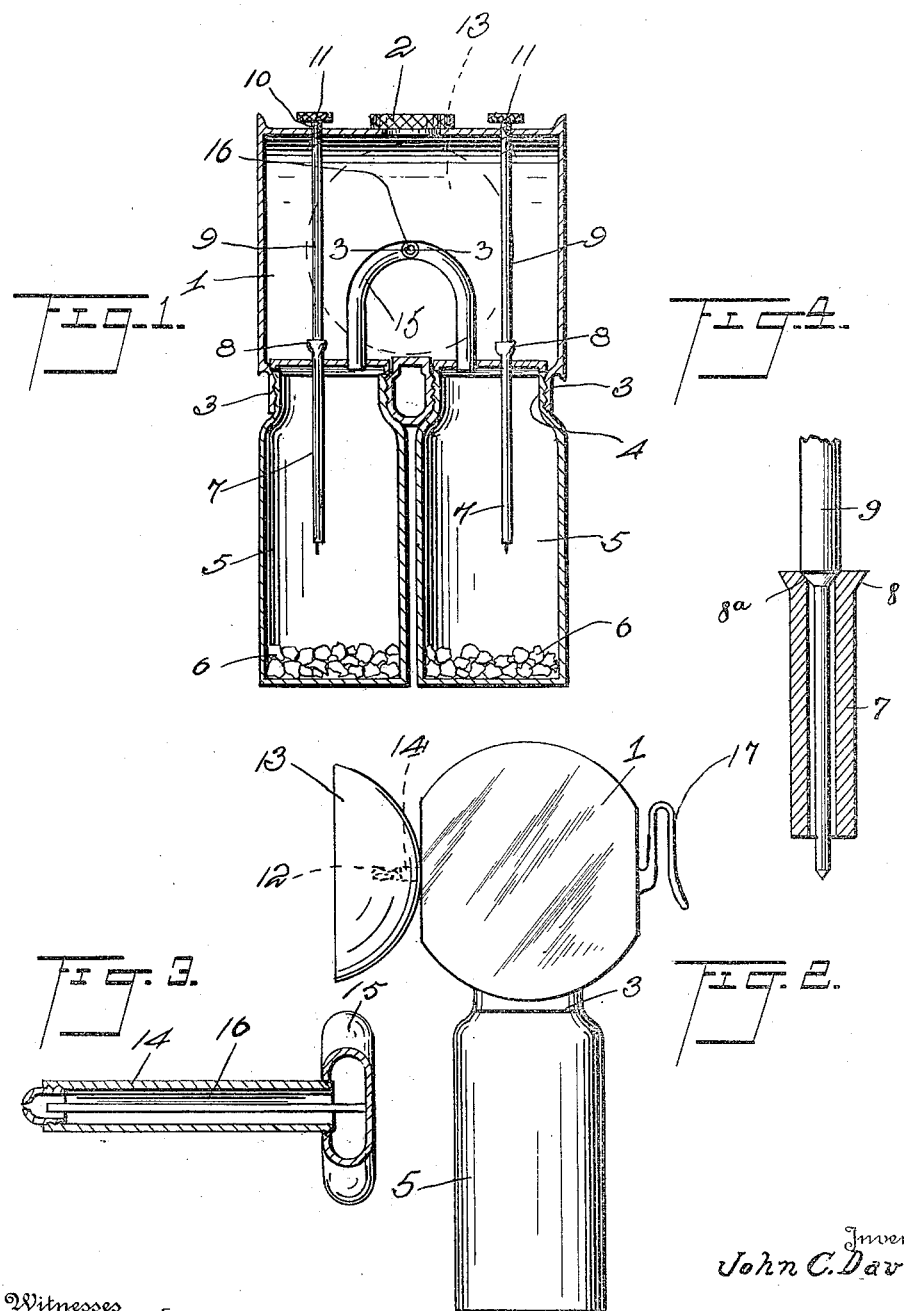

JOHN C. DAVIS, OF NANTY GLO, PENNSYLVANIA.

ACETYLENE-LAMP.

1,194,149.  Specification of Letters Patent.  Patented Aug. 8, 1916.

Application filed September 26, 1914. Serial No. 863,727.

*To all whom it may concern:*

Be it known that I, JOHN C. DAVIS, a citizen of the United States, residing at Nanty Glo, in the county of Cambria and State of Pennsylvania, have invented certain new and useful Improvements in Acetylene-Lamps; and I do hereby declare the following to be a full, clear, and exact description of the invention, such as will enable others skilled in the art to which it appertains to make and use the same.

This invention comprehends certain new and useful improvements in acetylene lamps, and has for its primary object to provide a device of this character which will be of improved construction and operation, and formed in such manner that either of the carbid containers may be refilled without extinguishing the light.

The invention has for another object to provide an improved form of water tank with a divided or forked gas supply pipe leading to the burner and connected with the interior of each of the carbid containers, whereby upon exhaustion of the gas in one of the carbid tanks, the water valve of the other carbid tank may be opened to permit water from the water tank to pass to the carbid tank and thereby cause creation of gas to be supplied to the burner during operation of refilling the exhausted carbid tank, thereby making it unnecessary to extinguish the light, as is the case with the ordinary form of acetylene lamp.

The invention has for a still further object to generally improve and simplify the construction and operation of devices of this character and increase the efficiency thereof without materially increasing the cost of the same.

Figure 1 is a vertical section through the lamp. Fig. 2 is a side elevation thereof. Fig. 3 is a detail sectional view on the plane of line 3—3 of Fig. 1, and Fig. 4 is a sectional view taken on the line 5—5 of Fig. 3.

Referring more particularly to the drawings in which similar reference characters designate corresponding parts throughout the several views, 1 designates a water tank which has a central filling opening 2 in its upper portion and which is provided with a pair of depending circular internally threaded flanges 3 within which are removably secured the reduced upper ends 4 of the carbid tanks 5 which are adapted to contain carbid, as shown at 6.

Depending from the bottom of the water supply tank 1 and extending into the carbid tanks 5 are the water supply pipes 7 which have enlarged upper ends 8 adapted to receive the tapered portions 8ª of the valve rods 9 for the purpose of cutting off the supply of water to the carbid tank 5, said valve rods 9 being threaded at their upper ends through the upper portion of the water supply tank, as shown at 10 and having suitable knobs 11 formed in their upper ends, by means of which the valve rods 9 may be rotated. When the gas generated in one of the carbid tanks 5 by the water fed from the water supply tank 1 to the carbid 6 in the tank 5 has been used a sufficient length of time to exhaust the carbid 6 and thereby make it necessary to replace the exhausted carbid by fresh carbid, this valve rod 9 is rotated to close the upper end of the water supply pipe 7 and the other valve rod 9 is rotated to open position to permit the water from the water supply tank 1 to pass to the second carbid tank 5 and generate gas in the same to supply the lamp burner 12 within the reflector 13 and mounted upon the outer end of the gas burner pipe 14. The inner end of the gas burner pipe 14 connects with the center of the inverted U-shaped gas supply pipe 15 which has its opposite depending legs threaded through the bottom of the water supply tank 1 to form communication with the carbid tanks 5 to receive the gas generated in the same. The gas from one carbid tank 5 cannot reach the opposite carbid tank or the opposite leg of the gas supply tank 15, owing to the fact that the gas supply pipe 15 as well as the burner feed pipe 14 is divided by means of the vertical partition strip 16 extending longitudinally of the burner feed pipe 14 from within a short distance of the burner 12 to the rear end of said burner feed pipe 14 and through the center of the gas supply pipe 15 and transversely of the same. It will therefore be seen that it will be perfectly safe to remove one of the carbid tanks 5 to refill the same while the burner 12 is being supplied with gas generated in the remaining carbid tank 5.

This acetylene lamp may be readily secured to a miner's cap or the like by means of the reversely curved hook 17 secured upon the rear side of the water supply tank 1, about the center of the same. The reflector 13 is mounted upon the end of the burner feed pipe 14 and surrounds the burner 12.

While the preferred embodiment of the invention has been shown and illustrated, it will be understood that minor changes in the details of construction, combination and arrangement of parts may be made without departing from the spirit and scope of the invention as claimed or sacrificing any of the advantages thereof.

What is claimed is:—

An acetylene lamp including a water tank, independent carbid tanks secured to and depending from the under side of the water tank, an inverted U-shaped gas supply pipe arranged vertically within the water tank, the respective ends of said pipe passing through the bottom wall of the water tank and communicating with the respective carbid tanks, a horizontally disposed gas feed pipe having its inner end connected to the front wall of the upper curved portion of the gas supply pipe and communicating with the latter, the gas feed pipe passing through the front wall of the water tank and having its outer end disposed in spaced relation to said wall, a burner tip secured in the outer end of the gas feed pipe, a single partition located within and dividing the gas supply pipe into separate passages, the outer end of said partition extending into said burner tip and its inner end extending beyond the inner end of the gas feed pipe into engagement with the inner surface of the rear wall of the gas supply pipe to divide the latter into two sections, each communicating with one of said passages and means for controlling the supply of water to the respective carbid tanks.

In testimony whereof I affix my signature in presence of two witnesses.

JOHN C. DAVIS.

Witnesses:
 Wm. J. Hunter,
 Arthur Millward.

Copies of this patent may be obtained for five cents each, by addressing the "Commissioner of Patents, Washington, D. C."